(12) United States Patent
Kuehn et al.

(10) Patent No.: US 9,698,635 B2
(45) Date of Patent: Jul. 4, 2017

(54) CORES FOR ELECTRICAL MACHINES

(71) Applicant: Hamilton Sundstrand Corporation, Charlotte, NC (US)

(72) Inventors: Daniel Kuehn, Roscoe, IL (US); Kevin L. Dickerson, Loves Park, IL (US); Luke Wagner, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 182 days.

(21) Appl. No.: 14/640,767

(22) Filed: Mar. 6, 2015

(65) Prior Publication Data
US 2016/0261153 A1    Sep. 8, 2016

(51) Int. Cl.
*H02K 1/24* (2006.01)
*H02K 1/26* (2006.01)
*H02K 3/20* (2006.01)

(52) U.S. Cl.
CPC .............. *H02K 1/265* (2013.01); *H02K 1/24* (2013.01); *H02K 3/20* (2013.01); *H02K 2213/03* (2013.01)

(58) Field of Classification Search
CPC .............. H02K 1/24; H02K 1/265; H02K 3/20
See application file for complete search history.

(56) References Cited

U.S. PATENT DOCUMENTS

| 6,177,750 B1 * | 1/2001 | Tompkin ............ H02K 1/28 310/211 |
| 2013/0026876 A1 | 1/2013 | Coldwate et al. |
| 2013/0181568 A1 | 7/2013 | Bangura |
| 2014/0103774 A1 | 4/2014 | Rasmussen et al. |

FOREIGN PATENT DOCUMENTS

| JP | S5869445 A | 4/1983 |
| JP | S6038048 U | 3/1985 |

OTHER PUBLICATIONS

European Search Report from the European Patent Office dated Jul. 13, 2016 for Application No. EP16158924.

* cited by examiner

*Primary Examiner* — Dang Le
(74) *Attorney, Agent, or Firm* — Locke Lord LLP; Scott D. Wofsy; Christopher J. Cillié

(57) ABSTRACT

A core for an electrical machine includes a core body. The core body extends long a rotation axis and includes two or more core segments axially stacked with one another along the rotation axis. A plurality of the core segments define notches that are axially-aligned to one another and form an axial slot. The first core segment notch has an area that is greater than an area of a second core segment notch to accommodate thermal expansion of the core.

14 Claims, 5 Drawing Sheets

CORES FOR ELECTRICAL MACHINES

BACKGROUND OF THE INVENTION

1. Field of the Invention

The present disclosure relates to electrical machines, and more particularly to cores for synchronous machine motors and generators.

2. Description of Related Art

Electrical machines like motors, generators, and starter/generators commonly include a rotor and a stator. The rotor is typically supported for rotation relative to the stator such that, in motor arrangements, electrical power applied to stator produces a magnetic field that interacts with the rotor and causes the rotor to rotate and thereby provide a source of rotational energy. In generator arrangements, rotational energy applied to the rotor causes a magnetic field produced by the rotor to move relative to windings disposed on the stator, induces current flow through the stator windings and produces electrical power suitable for harvest from the generator. In some applications, electrical machines like motor/generators include amortisseur bars disposed on the rotor that are electrically connected (e.g. short-circuited) to one another. In the generate mode, the amortisseur bars can dampen torsional oscillations imposed on the rotor by electrical load fluctuations. In the motor mode, current applied to the amortisseur bars produce a magnetic field that interacts with a magnetic field produced by the stator windings, thereby rotating the rotor and producing rotational energy. In either or both modes, heating of rotor can induce geometry change that creates stress on the rotor, which must be managed for reliable operation.

Such conventional cores and methods of making cores for electrical machines have generally been considered satisfactory for their intended purpose. However, there is still a need in the art for improved generators. The present disclosure provides a solution for this need.

SUMMARY OF THE INVENTION

A core for an electrical machine includes a core body extending along a rotation axis. The core body includes a first segment and a plurality of second segments axially stacked with one another along the rotation axis. The first and the second segments both define notches that are axially aligned with one another to form a slot. The notches of the second segments have areas that are each greater than an area of the first segment notch to accommodate thermal expansion of the core.

In certain embodiments, the first and second segments can include cobalt or a cobalt-containing alloy. The first and second segments can have plate-like bodies with peripheries extending about the rotation axis. The peripheries can be radially inner peripheries, and the first segment can be axially aligned with the second segment such that the inner peripheries of the first and second segments define a central aperture of the core body. The central aperture can seat a shaft, thereby enabling connection of the core to a prime mover. The peripheries can also be radially outer peripheries, and the notches of the first and second segment can be defined in the radially outer peripheries of the first and second segment plate-like bodies.

In accordance with certain embodiments, the periphery of the first segment plate-like body can define an opening into the first segment notch. The opening can be smaller than a width of an interior of the first segment notch. Circumferentially adjacent teeth can bound the opening, and the width opening can be smaller than a width of a damper bar seated within the first segment notch. It is contemplated that the first segment can be coupled to the second segment such that the first and second segments are axially stacked with one another the rotation axis, such as with a resin or other adhesive, for forming a laminated core body. An end segment formed from a material with a greater coefficient of thermal expansion than that of the first and second segments can be coupled to the second segment on a side opposite the first segment.

It is also contemplated that, in accordance with certain embodiments, the periphery of the second segment plate-like body can define an opening into the second segment notch. The opening can be as wide or wider than an interior width of the second segment notch at the widest point of the notch interior. The opening can be also be wider than the width of the damper bar seated within the slot defined by the notches of the first and second segments. The opening into the second segment notch can be greater than the first segment notch opening, the damper bar thereby being less constrained radially by the first segment than by the second segment of the core body. The damper bar can seat within the slot such that the damper bar is less radially constrained by the second segment than by the first segment, thereby allowing the damper bar to deflect away from the core body by progressively larger amounts in closer to the end plate. It is further contemplated that braze can fix the damper bar in the first segment, thereby radially restraining the damper bar and imposing shear stress on the first segment in a region bounding the first segment notch.

A rotor for a synchronous machine includes a shaft and a core body as described above seated on the shaft. A damper bar seated in the slot is radially unconstrained by the second segment, and is radially constrained by both the end segment and the first segment.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
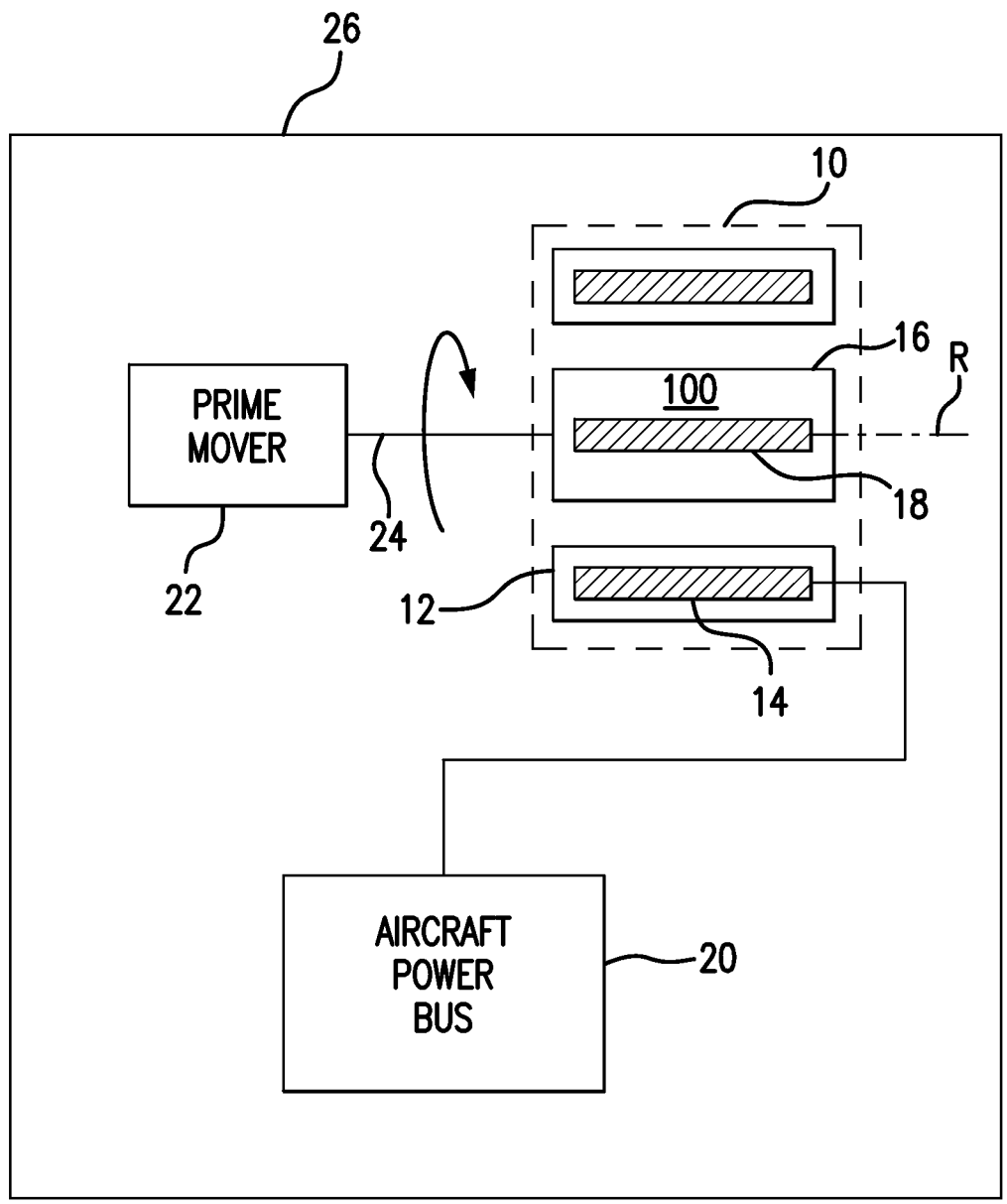
FIG. 1 is a schematic view of an exemplary embodiment of an electrical machine constructed in accordance with the present disclosure, showing a rotor and stator.

Reference will now be made to the drawings wherein like reference numerals identify similar structural features or aspects of the subject disclosure. For purposes of explanation and illustration, and not limitation, a partial view of an exemplary embodiment of an electrical machine in accordance with the disclosure is shown in FIG. 1 and is designated generally by reference character 10. Other embodiments of electrical machines in accordance with the disclosure, or aspects thereof, are provided in FIGS. 2-8, as will be described. The systems and methods described herein can be used for aircraft electrical systems, such as in synchronous machine generators for producing electrical power and/or synchronous machine motors for converting electrical power into mechanical rotational energy.

Exemplary electrical machine 10 includes a stator 12 with stator windings 14 and a rotor 16 carrying field coils 18. Stator windings 14 are fixed to stator 12 and are electrically connected to an aircraft power bus 20. Rotor 16 includes a core 100 carrying field coils 18 and is operatively coupled to a prime mover 22 by a shaft 24. In embodiments, prime mover 22 is a gas turbine engine or internal combustion engine. Electrical machine 10 may be a generator, a motor, or a starter/generator operatively associated with prime mover 22 for supplying power to power-consuming devices disposed on an aircraft. In certain embodiments, prime mover 22 is an aircraft main engine or auxiliary power unit for an aircraft.

Electrical machine 10 may have a generate mode. In the generate mode, prime mover 22 rotates rotor 16 by applying rotational energy to shaft 24. Shaft 24 applies the received rotational energy to rotor 16, thereby rotating rotor 16 about a rotation axis R and moving a magnetic field produced by field coils 18 relative to stator windings 14. Movement of the magnetic field induces a current flow within stator windings 14 which electrical machine 10 provides to aircraft power bus 20. Aircraft power bus 20 converts the received current into power suitable for one or more power-consuming devices (not shown for clarity purposes) coupled to aircraft power bus 20.

Electrical machine 10 may have a motor mode. In an exemplary embodiment, while in the motor mode, stator windings 14 receive current from aircraft power bus 20. The current flow produces a magnetic field that is fixed relative to rotor 16 and which interacts with a magnetic field produced by field coils 18. Interaction of the magnetic fields rotates rotor 16 about rotation axis R, provides rotational energy to prime mover 22, and enables starting prime mover 22 for purposes of autonomous operation thereafter.

In certain embodiments electrical machine 10 has both motor and generate modes. This enables electrical machine 10 to operate as a motor in motor mode, provide rotational energy to prime mover 22 for starting prime mover 22, switch to generate mode, and thereafter receive rotational energy from prime mover 22 for purposes of generating electrical power.

Figure 2:
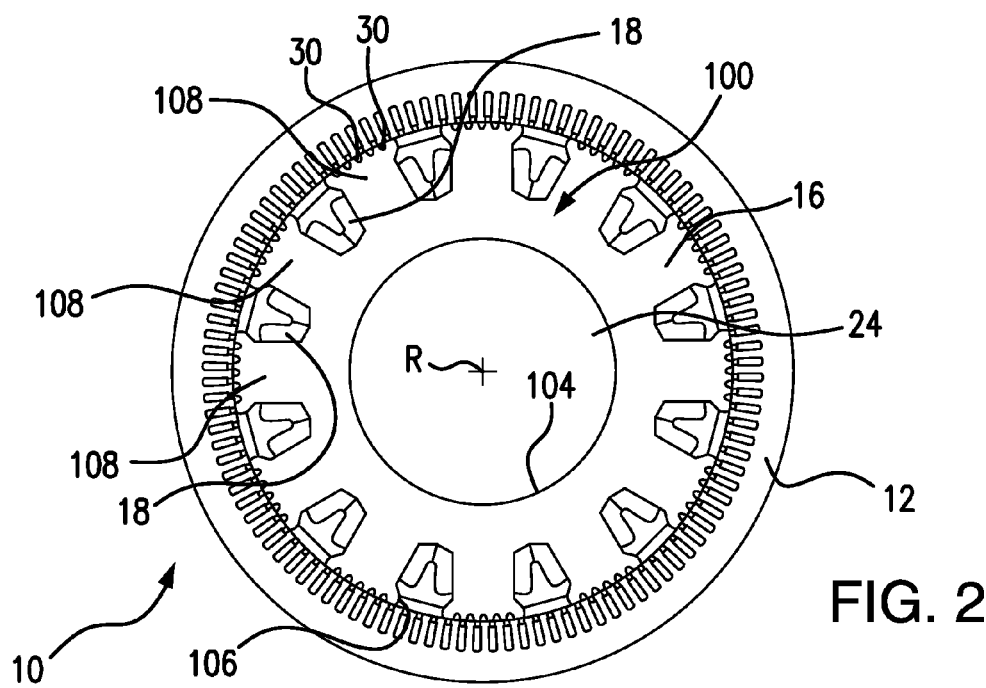
FIG. 2 is a schematic end view of the electrical machine of FIG. 1, showing a core of the rotor including a core body, damper bars, and a shaft.

With reference to FIG. 2, electrical machine 10 is shown. Electrical machine 10 includes stator 12 and rotor 16. Rotor 16 is rotateably supported about rotation axis R in relation to stator 12 by shaft 24 and includes core 100. Core 100 includes a core body 102 with a radially inner periphery 104 and a radially outer periphery 106, shaft 24, field coils 18, and damper bars 30. Radially inner periphery 104 defines a central aperture within which shaft 24 is seated.

Radially outer periphery 106 defines a plurality of rotor poles 108. Circumferentially adjacent rotor poles 108 define circumferentially between one another field coil slots. Rotor field coils 18 seat within each of the field coil slots. Respective rotor poles 108 define a pole face 110 (indicated in FIG. 3) that faces stator 12 across a radial gap defined between stator 12 and rotor 16.

As illustrated, electrical machine 10 is a brushless, wound field synchronous generator that may be operated as a motor in a starting mode to convert electrical power supplied by an external AC power source into motive power or, alternatively, in a generate mode to convert mechanical energy into electrical power. Typically, the starter generator is one assembly of an overall generator assembly, which may include a permanent magnet generator (PMG), an exciter generator for brushless operation and a main generator mounted on a common shaft.

Figure 3:
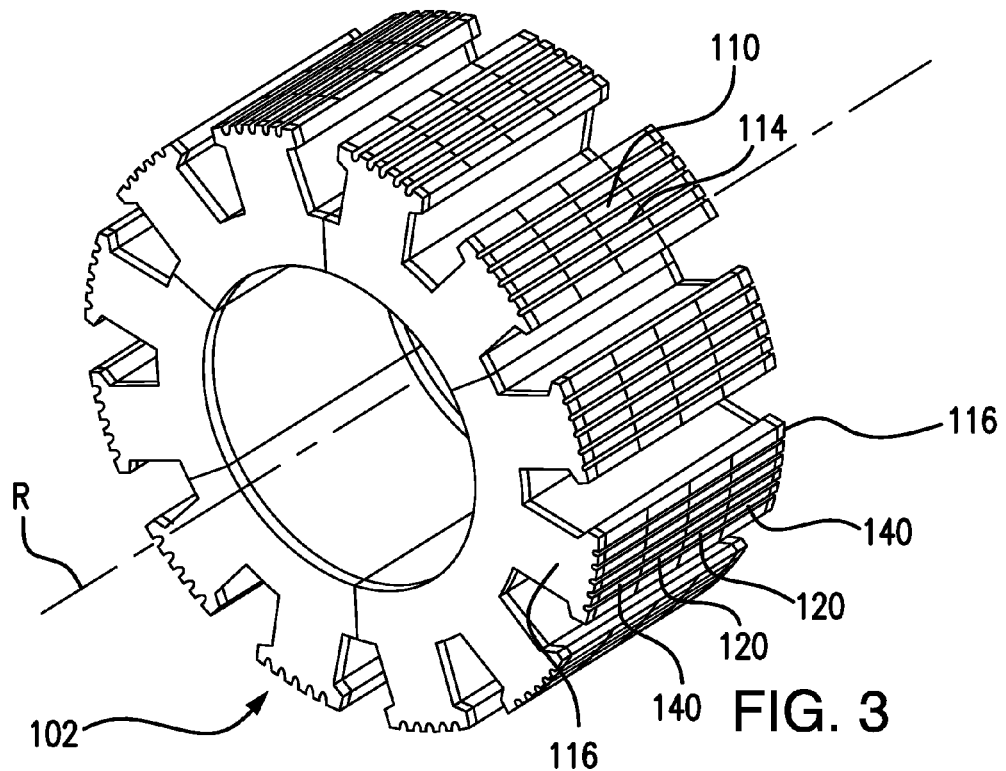
FIG. 3 is a perspective view of the core body of FIG. 2, showing first, second, and end segments of the core body.

With reference to FIG. 3, pole faces 110 of rotor poles 108 define axially extending slots 114. Each slot 114 seats a damper bar (Amortisseur bar) 30 that extends axially along a length of core body 102 and across the respective pole face 110 defining slot 114. Damper bars 30 are electrically connected to one another through end segments 116 to form a damping circuit (Amortisseur circuit), or damping winding. The damping circuit is operative to dampen torsional oscillation associated with electrical load variation and/or provide electromotive force for rotating rotor 16, dependent upon the operating mode(s) of electrical machine 10. Damper bars 30 include a paramagnetic or soft ferromagnetic material. For purposes of this description, a "paramagnetic material" is a material which is slightly magnetically attracted when in the presence of an externally applied magnetic field, and may have a relative magnetic permeability greater or equal to unity (i.e., a positive magnetic susceptibility) and hence is attracted to magnetic fields.

Core body 102 includes end segments 116, at least one first segment 120, and a plurality of second segments 140. First segment 120 is axially stacked with the plurality of second segments 140 and end segments 116 along rotation axis R. First segment 120 is coupled to the plurality of second segments 140 by a resin or laminate. End segments 116 are mechanically coupled to second segments 140 at opposite ends of the laminated structure by damper bars 30. Damper bars 30 are fixed to end segments 116 by a brazed joint or other suitable fastening arrangement.

End segments 116 include a material with a greater coefficient of thermal expansion than a material included in first segment 120 and/or the plurality of second segments 140. In certain embodiments, first segment 120 and/or the plurality of second segments 140 include a cobalt-containing alloy, such as a cobalt-iron-vanadium alloy. End segments 116 may include a conductive material, such as aluminum, copper, or other material for an intended application.

One challenge with some kinds of conventional electrical machines is that the rotor core body is exposed to heat during operation, such as from resistive heating in stator windings 14 (shown in FIG. 1) and/or rotor field coils 18 (shown in FIG. 2). Heating can also result from windage, i.e. heat generated by the friction of rotor poles passing through an oil or cooling fluid. Since end segments 116 include a material with a greater coefficient of thermal expansion than first segment 120 and/or the plurality of second segments 140, heating can cause end segments 116 to expand at a greater rate than first segment 120 and the plurality of second segments 140. In conventional core arrangements, heating can cause portions of damper bars proximate to end segments to displace radially further than portions of damper bars further away from the end segments, loading the core body and imposing stress on portions of the segments radially restraining the damper bar or the damper bars themselves. In some core bodies, the stress can be sufficient to fracture the core body or the damper bars themselves. For example, shear stress imposed on the core structure bounding the damper bar slot by radial deflection of the damper bar which, due to differences between their respective coefficients of thermal expansion, can be sufficient to fracture the portion of the core structure radially restraining the damper bar unless the rotor temperature is maintained below a predetermined limit.

Figure 4:
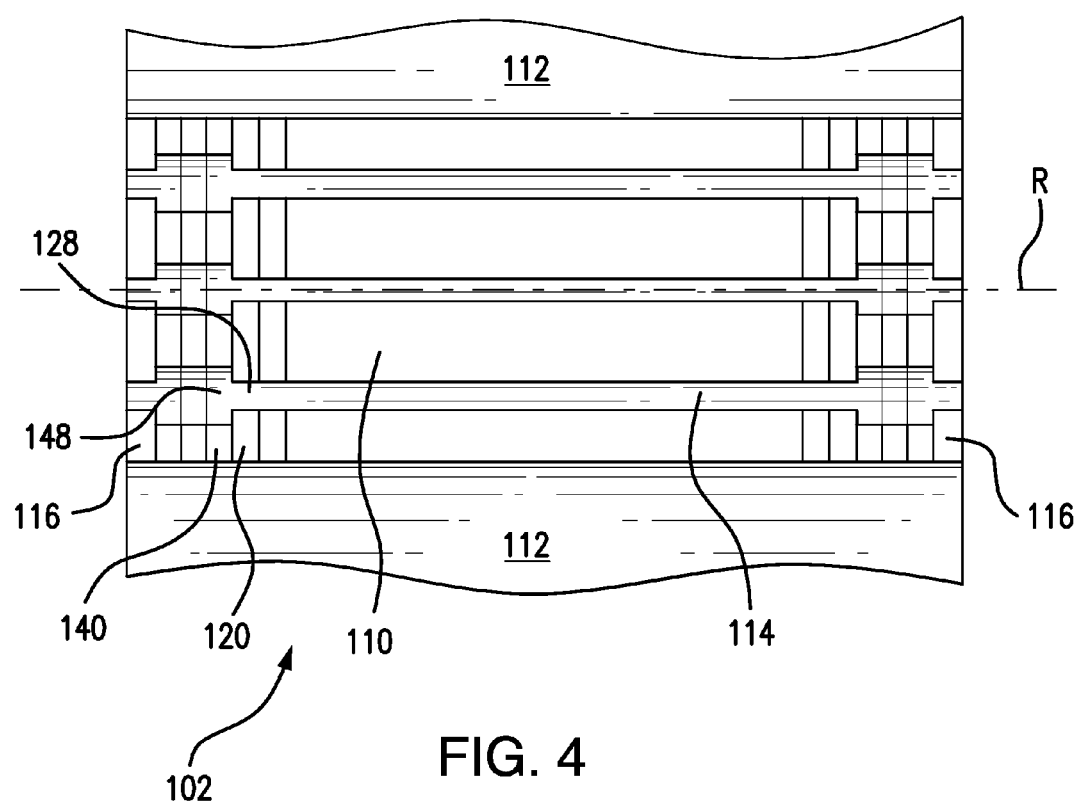
FIG. 4 is a plan view of the core body of FIG. 2, showing a pole face and damping bar slots defined within the core face by the first and second segments.

With reference to FIG. 4, a partial plan view of core body 102 is shown. Second segment 140 is axially stacked between first segment 120 and end segment 116 such that a second segment notch 148 is axially aligned with a first segment notch 128, thereby forming slot 114. Slot 114 is configured to seat damper bar 30 (shown in FIG. 2) such that damper bar 30 extends axially along the length of core body 102 between opposed end segments 116. As illustrated, second segment notch 148 has a greater area and/or a wider circumferential opening that first segment notch 128, allowing damper bar 30 to deflect away from core body 102 (i.e. out of the drawing sheet) at portions of core body 102 proximate end segments 116. This can reduce stress within portions of core body 102 that could otherwise experience loadings that exceed the yield strength of the material. In embodiments, it also simplifies manufacturer by accommodating excess resin or brazing material without influencing ability of damper bar 30 to deflect form core body 102.

Figure 5:
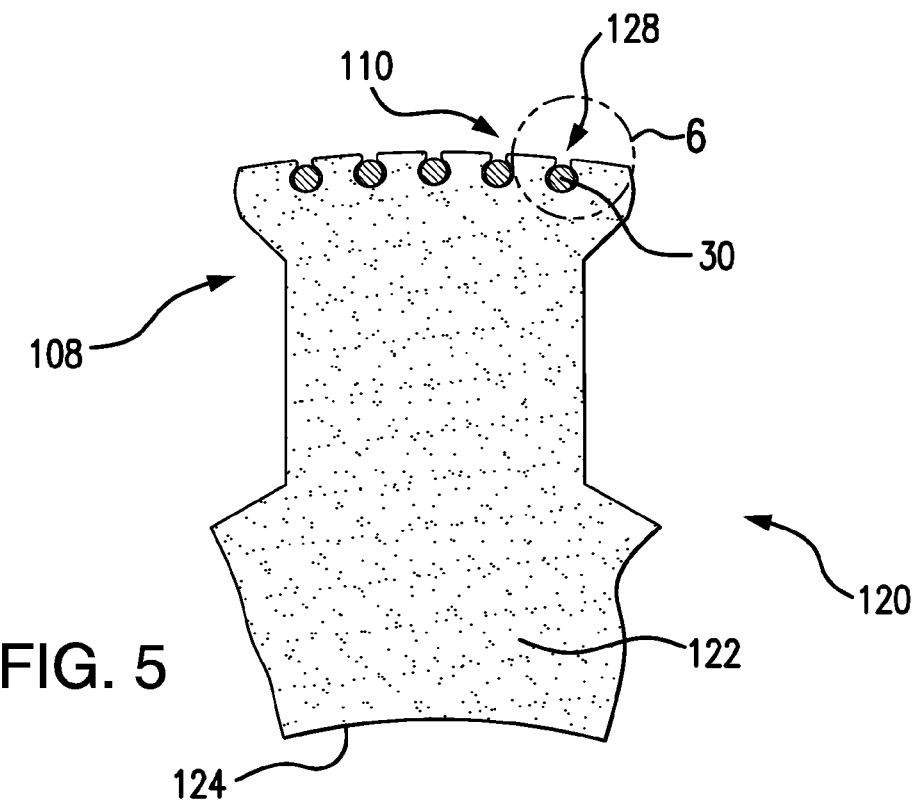
FIG. 5 is partial end view of a first segment of the core of FIG. 4, showing damper bars seated in slots having openings narrower than the damper bar.

With reference to FIG. 5, a portion of first segment 120 including rotor pole 108 is shown in an axial end view. First segment 120 includes a plate-like body 122 constructed from a cobalt-containing material. Plate-like body 122 extends radially between a first segment inner periphery 124 and a first segment outer periphery 126, and is coupled to second segment 140 (shown in FIG. 4) such that the inner peripheries of the first and second segments both define portions of inner periphery 104 (shown in FIG. 2) and the outer peripheries of the first and second segments both define portion of radially outer periphery 106 (shown in FIG. 2).

First segment outer periphery 126 defines first segment notch 128. First segment notch 128 is aligned with second segment notch 148 (shown in FIG. 4) to form slot 114 (shown in FIG. 4). Damper bar 30 seats within first segment notch 128.

Figure 6:
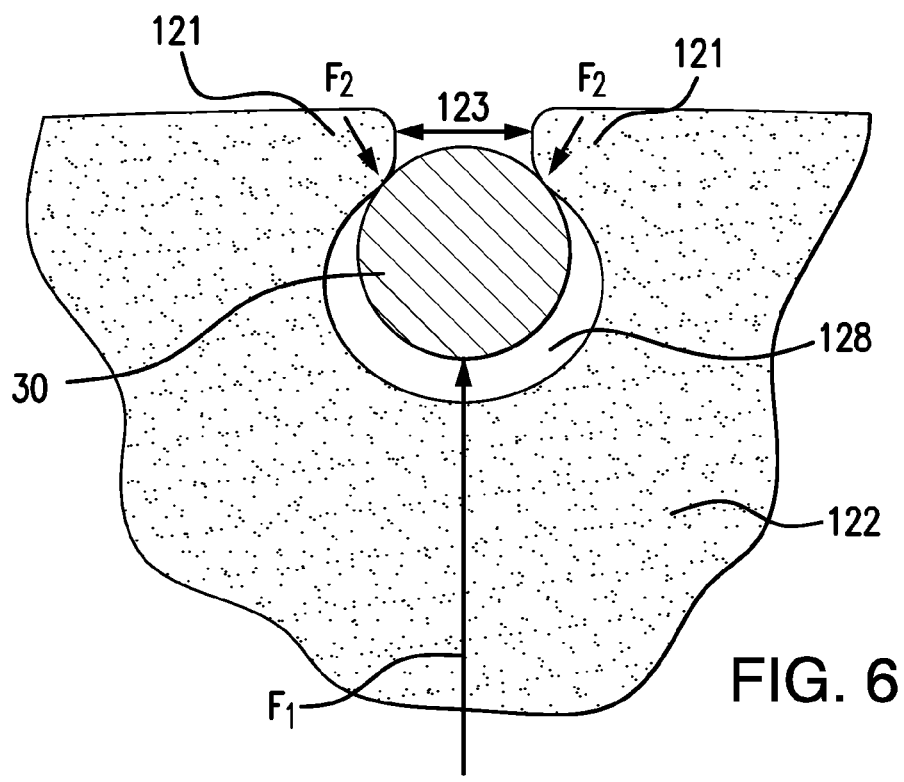
FIG. 6 is a partial end view of a portion of the first segment of FIG. 5, showing teeth defined by the first segment slot radially constraining the damper bar.

With reference to FIG. 6, a portion of plate-like body 122 is shown including first segment notch 128. Plate-like body 122 includes a pair of circumferentially-opposed notch teeth 121. Circumferentially opposed notch teeth 121 bound a portion first segment notch 128 and define therebetween an opening 123 into first segment notch 128. Opening 123 has a width that is smaller than a width of damper bar 30, radially constraining damper bar 30 such that radially outward forces, e.g. force $F_1$, urge a radially outer surface damper bar 30 against interior surfaces of teeth 121. The force loads plate-like body 122, and impose stresses upon the material forming teeth 121. As will be appreciated, stress above a predetermined limit can exceed the ultimate stress of the material forming first segment 120, fracturing plate-like body 122 and potentially causing portion(s) of teeth 121 to separate from plate-like body 122.

Also shown are forces $F_1$ and $F_2$. Force $F_1$ results from the differential in radial growth between first segment 120 and end segment 116. The differential in radial growth results from the difference between the coefficient of thermal expansion of the material forming end segment 116 relative to the coefficient of thermal expansion of the material forming first segment 120. This causes end segment 116 to drive damper bar 30 radially outward, causing $F_1$, and giving rise to opposing force $F_2$ which is equal and opposite to force $F_1$. As will be appreciated, force $F_2$ imposes stress within first segment 120.

Figure 7:
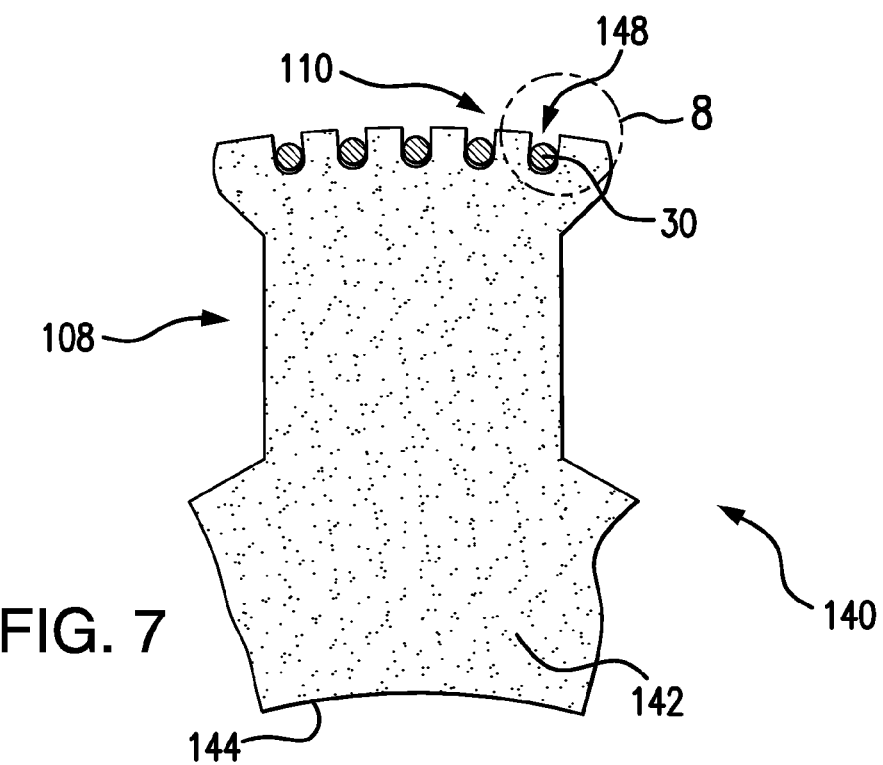
FIG. 7 is partial end view of a second segment of the core of FIG. 4, showing damper bars seated in slots having openings that are wider than the damper bar.

With reference to FIG. 7, a portion of second segment 140 including rotor pole 108 is shown in an axial end view. Second segment 140 includes a plate-like body 142. Plate-like body 142 is constructed from a cobalt-containing material, such as a cobalt-iron-vanadium alloy or other suitable cobalt alloy, and extends radially between an inner periphery 144 and an outer periphery 146. Inner periphery 144 aligns axially with first segment inner periphery 124 (shown in FIG. 5) to collectively form therewith core inner periphery 104 (shown in FIG. 2); outer periphery 146 aligns axially with first segment outer periphery 126 (shown in FIG. 5) to collectively form therewith core outer periphery 106 (shown in FIG. 2). In this respect second segment 140 and first segment 120 (shown in FIG. 5) form axially stacked segments of a laminated core body for an electrical machine.

Second segment notch 148 is defined by outer periphery 146 within pole face 110. Second segment notch 148 is aligned with first segment notch 128 (shown in FIG. 5), collectively forming portions slot 114 (shown in FIG. 4). Damper bar 30 seats within second segment notch 148.

Figure 8:
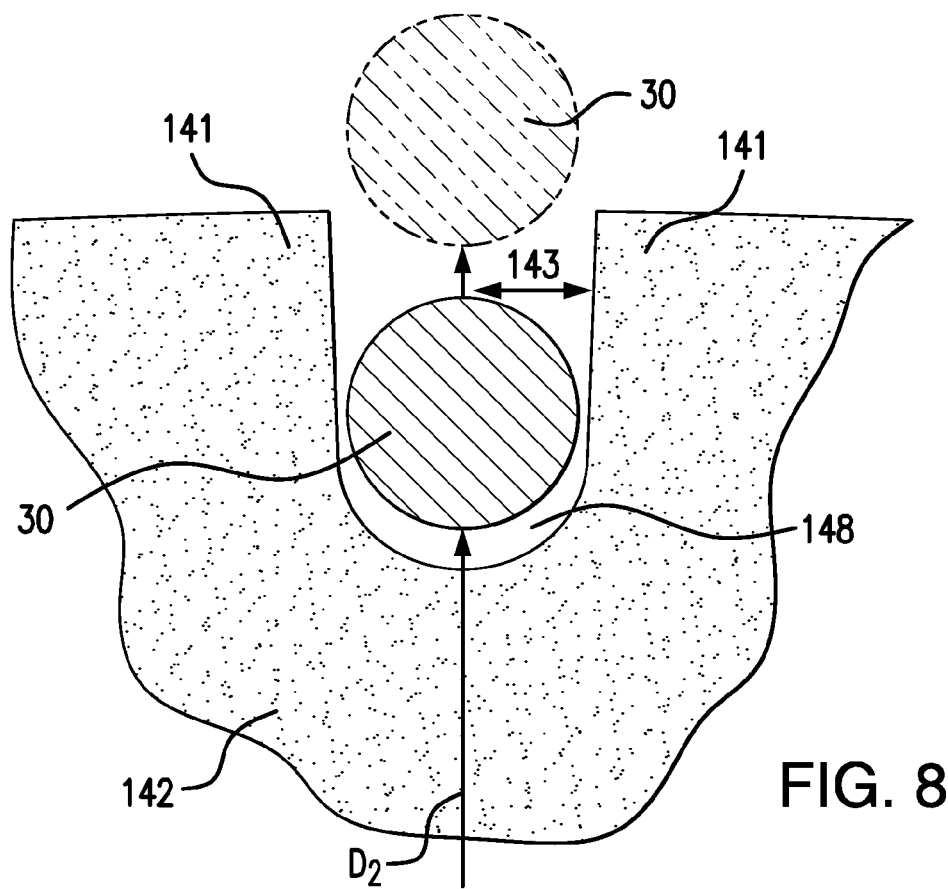
FIG. 8 is a partial end view of a portion of the first segment of FIG. 7 showing faces of the second segment slot that allow for deflection of the damper bar.

With reference to FIG. 8, a portion of second segment plate-like body 142 is shown including second segment notch 148. Plate-like body 142 includes a pair of circumferentially opposed faces 141. This can provide a second segment notch 148 is greater than a notch area of first segment notch 128, allowing for residual resin associated with lamination of second segment 140 to first segment 120 to deposit within second segment notch 148 without fixing damper bar 30 to plate-like body 142 within second segment notch 148.

Circumferentially opposed faces 141 bound a portion second segment notch 148 and define therebetween an opening 143 into second segment notch 148. Opening 143 has a width that is greater than the width of damper bar 30. This arrangement damper bar 30 to seat within second segment notch 148 such that it is less constrained by second segment 140 than by first segment 120 (shown in FIG. 5). In embodiments, it is contemplated that damper bar 30 be substantially unconstrained by second segment 140. Radially unconstrained, damper bar 30 can radially displace in response to displacement imposed by thermal expansion of end segment 116 (shown in FIG. 4), e.g. displacement $D_1$, between first and second positons. As will be appreciated, because there is no structure to oppose $D_1$, therein no associated counterforce, and stress on second segment 140 associated with thermal heating of core 100 is reduced or entirely eliminated.

It is to be understood and appreciated that the stress imposed on the axially stacked segments forming core body 102 is a function of the proximity of a given segment to end segment 116. Accordingly, one or more second segments 140 can be axially stacked with one another between first segment 120 and end segment 116, as suitable for a given application, such as at axial locations where $F_2$ would impose stress above the yield stress of the material forming the segment under operating conditions.

Some electrical machines rotors include cores formed from material with different coefficients of expansion. For example, some electrical machines include cobalt alloy (e.g. a cobalt-iron-vanadium alloy) and end segments including copper at axially opposite ends of the rotor. The copper end laminations are typically brazed to damping bars that run the axial length of the core. In some arrangements the damping bar cannot be radially constrained by the cobalt alloy because copper tends to expand significantly more than the cobalt alloy for a given temperature change. This is because copper has a coefficient of thermal expansion (CTE) of about $9.2 \times 10^{-6}$ to $9.8 \times 10^{-6}$ in/° F., whereas cobalt alloys can have a CTE of about $4.96 \times 10^{-6}$ to $5.24 \times 10^{-6}$ in/° F., or a CTE difference of about $3.96 \times 10^{-6}$ to $4.84 \times 10^{-6}$ in/° F. Due to the CTE difference of the materials, the end segments therefore tend to expand more rapidly than the interior segments. This causes the damper bars to deflect radially outward progressively, outer segments of the core therefore generally experiencing greater loadings and stress than interior segments of the core.

In embodiments described herein, first segment 120 may experience smaller amounts of damper bar deflection than second segment 140. Providing relatively wide notch openings on second segment 140 can reduce the loading and associated stress on second segment 140 by allowing the damper bar to deflect freely from second segment 140. The relatively large area of the outer segments can also alleviate the problem of braze filling the gap between second segment 140 and the damper bar by providing space for the material to deposit without bonding the damper bar to second segment 140.

In an exemplary embodiment, a plurality of second segments 140 (e.g. six second segments) are axially stacked between end segment 116 and first segment 120. This can provide sufficient radial freedom for deflection of the damper bar at an axial end of the core to prevent fracturing teeth that radially constrain the damper bar within the damper bar slot while allowing one or more first segments 120 disposed axially inward of the core to radially restrain the damper bars. As will be appreciated, any number of segments can have widened notches, as suitable for a given application of the core body.

The methods and systems of the present disclosure, as described above and shown in the drawings, provide for electrical machines with superior properties including improved reliability. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A core for an electrical machine, comprising:
   a core body defining a rotation axis, the core body including:
   a first segment;
   a second segment axially stacked with the first segment along the rotation axis; and
   an end segment coupled to the second segment on a side of the second segment opposite the first segment along the rotation axis,
   wherein notches defined by the end segment, the second segment, and the first segment align with one another to form an axial slot,
   wherein width of a radially outer opening into the second segment notch is greater than width of a radially outer openings into the end segment notch and the first segment notch to accommodate thermal expansion of the core body.

2. A core as recited in claim 1, wherein the second segment has a plate-like body with an outer periphery extending about the rotation axis and defining the second segment notch.

3. A core as recited in claim 2, wherein the second segment plate-like body has an inner periphery disposed radially inward of the outer periphery and extending about the rotation axis.

4. A core as recited in claim 1, wherein the opening into the second segment notch is as wide or wider than a radially inner width of the second segment notch.

5. A core as recited in claim 1, wherein a radially inner width of the first segment notch is greater than a width of an opening into the first segment notch.

6. A core as recited in claim 5, wherein the opening into the first segment notch is bounded by circumferentially-opposed teeth.

7. A core as recited in claim 1, wherein the first segment is inboard and axially stacked with the second segment along rotation axis, wherein both the first and second segment include a material with substantially equivalent thermal expansion coefficients.

8. A core as recited in claim 7, wherein the second segment is coupled to the first segment by a resin.

9. A core as recited in claim 7, wherein the first and second segments both include cobalt or a cobalt-containing alloy.

10. A core as recited in claim 1, wherein the end segment includes a material with a thermal expansion coefficient greater than that of the second segment.

11. A core as recited in claim 10, wherein the end segment is mechanically coupled to the first and second segments by a damping bar seated in both the first and second segment notches.

12. A core as recited in claim 11, wherein the damping bar is more radially constrained by the first segment than by the second segment.

13. A core as recited in claim 10, wherein the first and second segments include cobalt or a cobalt-containing alloy and the end segment contains copper or a copper-containing alloy.

14. A rotor for a synchronous machine, comprising:
   a shaft defining a rotation axis;
   a core as recited in claim 1 seated on the shaft; and
   a damper bar seated in the axial slot, fixed in the end segment notch, and coupling the end segment to the second segment,
   wherein the damper bar is radially constrained by both the first segment and the end segment, and
   wherein the damper bar is radially unconstrained by the second segment.

* * * * *